April 19, 1932. B. R. BENJAMIN 1,854,822
CULTIVATOR
Filed June 11, 1928 2 Sheets-Sheet 2
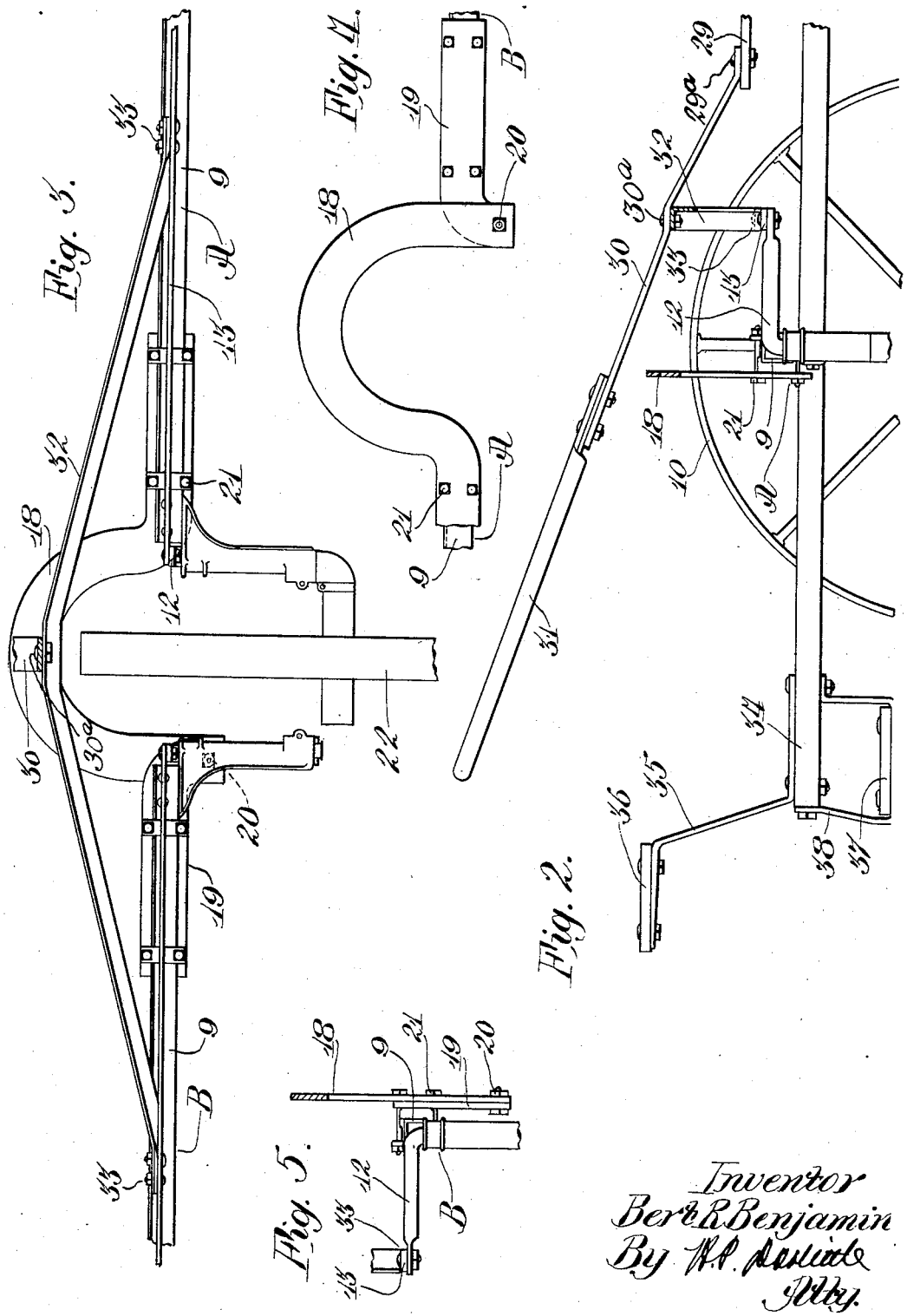
Inventor
Bert R Benjamin
By W. P. [signature]
Atty.

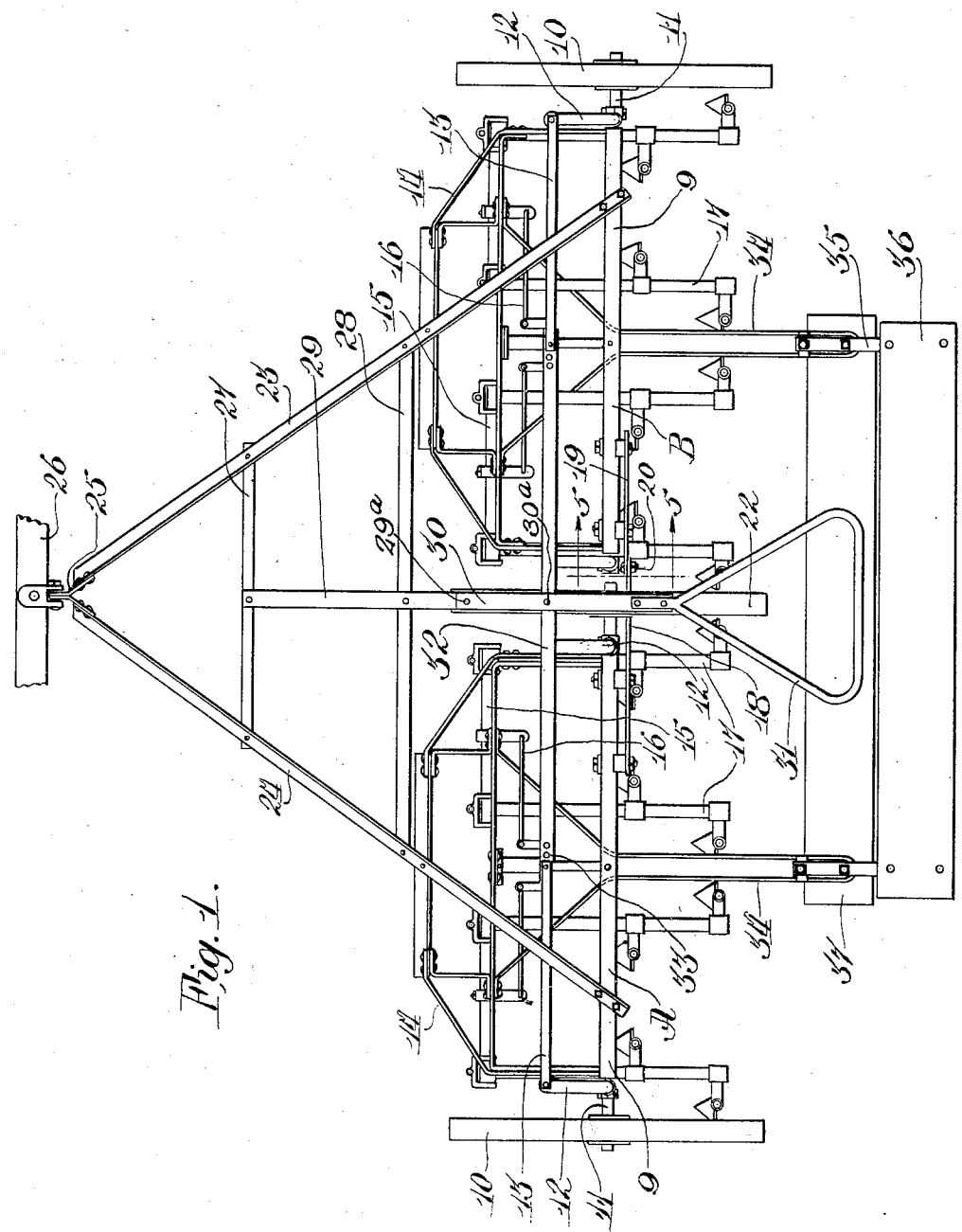

Patented Apr. 19, 1932

1,854,822

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

CULTIVATOR

Application filed June 11, 1928. Serial No. 284,296.

This invention relates to tillage implements, and more particularly to tractor drawn implements intended for operation over a plurality of plant rows.

The main object of the invention is to provide an organization for cultivating a plurality of plant rows which will permit use of existing types of implements as units in the organization. More specifically, the main object of the invention is to provide means whereby two or more straddle row cultivators of the horse drawn type may be connected in side by side relation and drawn as a unit by a tractor, a unitary control for the guiding mechanisms of the connected machines being also included in the novel organization.

The above and other minor objects and advantages, which will become apparent from the more detailed description hereinafter given, are embodied in the structure illustrated in the accompanying drawings wherein:

Figure 1 is a plan view of a cultivator organization embodying the novel features of construction;

Figure 2 is a longitudinal, vertical section of the upper part of the frame structure shown in Figure 1;

Figure 3 is a detail view of the central connection between the cultivator frames as viewed from the front;

Figure 4 is a detail of the arched connecting bar shown in Figure 3, viewed from the rear; and Figure 5 is a detail sectional view on an enlarged scale on line 5—5 of Figure 1.

The present embodiment of the invention is shown as comprising two two-row cultivators A and B, of the straddle row type and preferably of the type having shiftable gangs and pivot wheels which are moved in unison to guide the implement along plant rows. The cultivators illustrated each comprise an arched axle structure 9 supported on wheels 10 mounted on swiveled standards and spindles 11 at each end which form the vertical arms of the arched structure. Each standard has a forwardly extending crank arm 12 and the two standards on each unit are connected by a radius bar 13. The frame 14 of the cultivator unit supports the usual pair of laterally shiftable arches seen at 15 (Figure 1), both of which are connected through linkage 16 to the radius bar 13. The usual pairs of cultivator beams 17 are connected to the arms of the arches 15 and shift in unison therewith. The two-row cultivator structure briefly described above is that of the patent to Dennis 1,667,374, April 24, 1928, where more detailed description of the structure will be found.

In the practice of the present invention, two such cultivator units as described are placed side by side with the axle structures of the respective units in alignment. The wheel and bearing spindle at the inner side of one of the units is removed, as best shown in Figure 3, and the two axle structures are connected by an arched bracket member 18. This member 18 is preferably pivoted on the axle structure of the cultivator unit from which the inner wheel has been removed, as by means of a horizontal clamp plate 19 bolted on the axle structure and having a projecting end to which the arched bracket 18 is connected by a pivot bolt, as at 20. The opposite end of the bracket 18 is bolted to the axle structure of the other unit, as at 21. By this construction the inner side of the unit from which the wheel has been removed is supported on the axle structure of the adjacent unit and both are supported on the single central wheel 22, which is on the swiveled standard 12 of that unit. The supporting bracket 18 is arched to pass over the wheel 22, and its connection at 20 is preferably pivotal so that a certain amount of flexibility in a transverse plane is provided for, so far as permitted by the natural resiliency of the structural elements now to be described.

The cultivator units are connected by a draft frame which is common to both and which comprises forwardly converging bars 23—24, the rear ends of which are secured to the frames of the respective cultivator units, and the forward ends of which are connected to a clevis member 25 adapted for connection to the drawbar 26 of a tractor. The converging draft bars 23—24 constitute an A-shaped frame having transverse bracing members 27—28. These transverse members are preferably connected by a central longitudinal member 29, and on the rear end of this member (Figure 2) there is pivoted on a vertical axis at 29ª a rearwardly and upwardly extending control lever 30, which terminates in a wide, heart-shaped hand bar 31. Intermediate its ends the lever 30 is pivoted at 30ª to an arched member 32 (Figure 3), the arms of which extend to each cultivator unit and which is located in the same vertical plane as the radius bars 13 which control the steering and shifting mechanism of each cultivator unit. The arms of the arched bar 32 are bolted to the respective radius bars 13, as at 33, and the bar 32, together with the two radius bars 13, thereby constitute a unitary structure. The rearwardly extending seat bars 34 belonging to each cultivator unit are made to serve as supports for posts 35 which extend upwardly a certain distance and carry an operator's bench or seat 36. The seat bars may also serve to support a footboard 37, which may be carried in hangers 38 connected to the seat bars.

With the organization above described, it will be seen that two cultivator units of standard type may be joined to form a multiple row cultivator,—in this instance, a four-row machine. It will also be seen that a single operator seated on the bench 36 may readily observe the operation of the combined units and control the gang shifting and wheel steering mechanisms of both cultivator units simultaneously through the lever 30 and its connections, the handle 31 of which is within easy reach of the operator irrespective of his position on the bench 36.

There has accordingly been provided a simple and efficient structure by the use of which two or more cultivator units may be united into one machine organization for use behind a tractor, with the added efficiency and other advantages obtainable through the use of two or more ordinary units at once, and, while the above structure exemplifies the preferred embodiment of the invention, modifications thereof are obviously possible within the scope of the following claims.

What is claimed is:

1. In a multiple row tractor cultivator organization, the combination with two straddle-row cultivator units of the pivot wheel, shiftable gang type having means on each unit for shifting its gangs and steering its wheels, of means for connecting the units side by side for operation as a single unit comprising means for supporting the inner side of one unit on the axle structure of the other, a central A-shaped draft frame having its branches secured to the respective units, an operator's platform at the rear of the units supported on the seat posts of the two units, a lever pivoted on the draft frame and extending rearwardly towards said platform, and connections between said lever and the shifting means for the wheels and gangs of the units.

2. In a multiple row tractor cultivator organization, the combination with a plurality of straddle-row cultivator units of the pivot wheel, shiftable gang type, of means for connecting and operating the units side by side comprising means for supporting the inner side of one unit on the axle structure of the adjacent unit, a draft frame comprising forwardly converging members connected to the respective units and connected by a crosspiece, a laterally swinging lever supported centrally on the crosspiece, and laterally extending connections between said lever and the units for steering the wheels and shifting the gangs on the units simultaneously.

3. In a multiple row tractor cultivator organization, the combination with a plurality of straddle-row cultivator units of the pivot wheel, shiftable gang type having means on each unit for shifting its gangs and steering its wheels, of means for connecting and operating the units side by side comprising a draft frame having members connected to each unit and extending forwardly, and means for steering the wheels and shifting the gangs on the units simultaneously comprising a manually operable control device mounted centrally on the draft frame and connected to the shifting means for the gangs and wheel supports of each unit.

In testimony whereof I affix my signature.

BERT R. BENJAMIN.